Z. I. PRATT.
Fare-Boxes.
No. 136,865. Patented March 18, 1873.
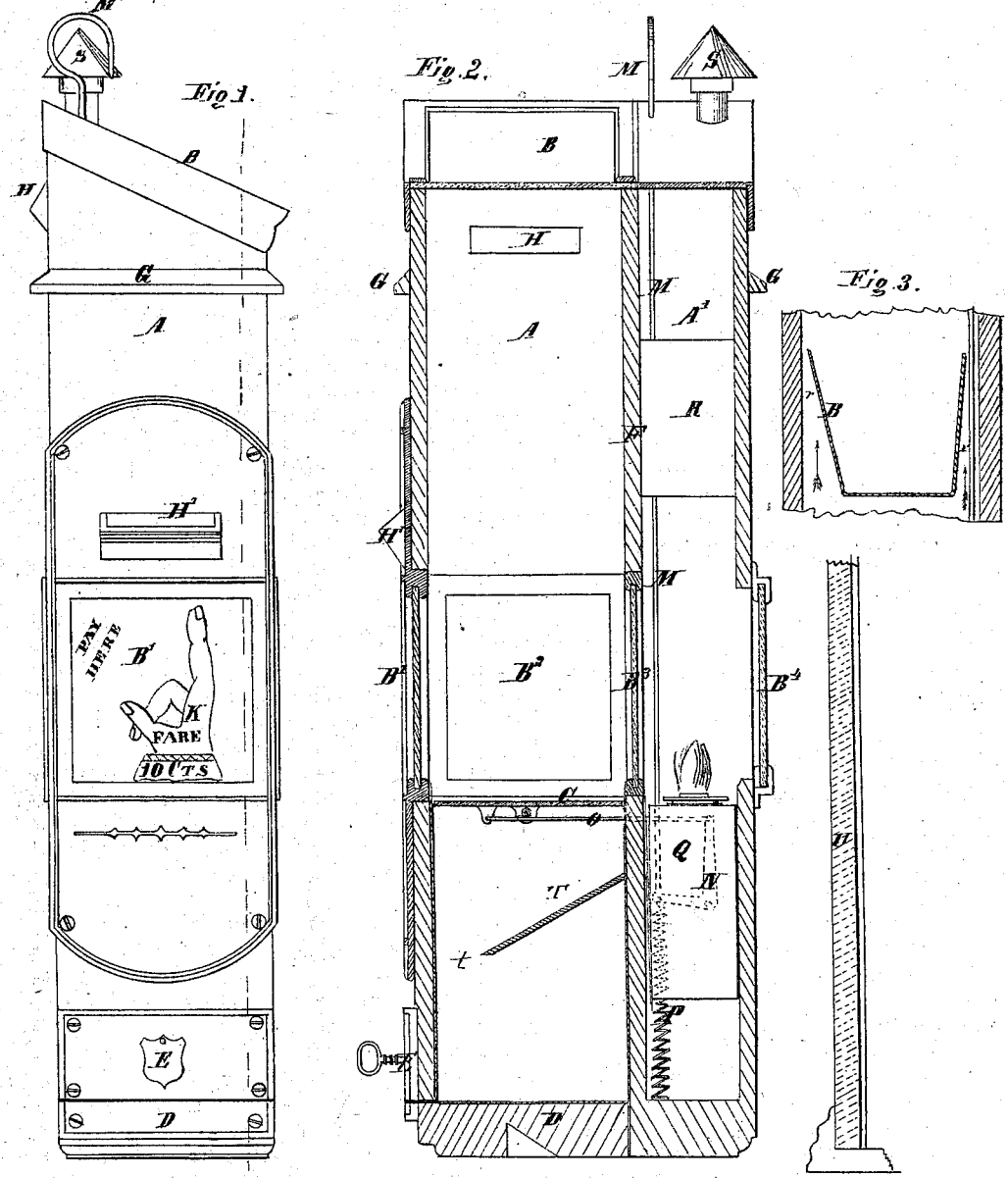
Witnesses:
J. W. Munday
H. Bruns.
Inventor:
Zimri I. Pratt

UNITED STATES PATENT OFFICE.

ZIMRI I. PRATT, OF CHICAGO, ILLINOIS.

IMPROVEMENT IN FARE-BOXES.

Specification forming part of Letters Patent No. 136,865, dated March 18, 1873.

*To all whom it may concern:*

Be it known that I, ZIMRI I. PRATT, of Chicago, in the county of Cook and State of Illinois, have invented certain Improvements in Fare-Boxes for Omnibuses and other similar vehicles; and I do hereby declare that the following is a full, clear, and exact description thereof, reference being had to the accompanying drawing, which, together with the letters and figures marked thereon, forms part of this specification, and in which—

Figure 1 is a front view of my improved fare-box; Fig. 2, a vertical section from front to rear of Fig. 1, taken on the line $x\ x$; Fig. 3, a sectional view of a portion of the back part of the fare-box to show the device for creating a draft to the lamp.

Like letters of reference made use of in the several figures indicate like parts.

To enable those skilled in the art to make and use my invention, I will proceed to describe the same with particularity, making reference in so doing to the aforesaid drawing.

General Description.

A is an oblong or elongated box, fitted at the top with the glass B, and having a trap or tilting floor, C, near the bottom. Below this trap is the bottom, formed of a sliding piece, D, which may be removed at pleasure, and which may be locked by an ordinary lock, E. A chamber, A', is formed at the rear of the box A, extending vertically its full height, and separated therefrom by the partition F. Glass is inserted in all sides of the box A at a level with the trap C, and also in the partition F. These several panes of glass, being indicated by the letters $B^1\ B^2\ B^3\ B^4$, serve to light up the money upon the trap so that it may be seen by the driver. The top of this fare-box, when in use, projects through the roof of the omnibus or other vehicle at or near the driver's seat; and the box is furnished on the outside with a surrounding flange, G, which rests upon or under the roof of the vehicle, and by which said box is suspended from and through the driver's seat and roof a short distance from the inner front end of the omnibus or other vehicle, and so that the openings or glasses $B^4\ B^3$ shall be directly in front of a mirror, U, which is usually attached to the inner front end of an omnibus. Near the top of the box, and above the roof of the vehicle, is an aperture, H, through which the fares of outside or roof passengers may be introduced. Within the vehicle, and immediately above the glass $B^1$, is an aperture, H', for the admission of fares for inside passengers; and to direct attention to this point the glass $B^1$ is decorated with an index or hand, K, pointing to said aperture, and an appropriate notice is, besides, placed in words upon said glass. The index and words are cut or ground into the substance of the glass itself. All the fares inserted drop first upon the trap C, and are retained there so that the driver may see that the correct amount is paid in, which he does by looking through the glass B at the top. A vertical rod, M, descends from the top of the box through one side of the chamber A', and is attached to an arm of the bell-crank lever N, which is pivoted to the side of the box. The other arm of said bell-crank is pivoted to the horizontal rod O, which is attached to the tilting floor or trap C, so that the said trap is tilted by pulling up the rod M. A spring, P, is connected to this mechanism, so that by its retraction the rod M is drawn down and the trap thrown back, when said rod M is released by the driver. The fares are thus dropped by the trap upon the sliding bottom D, where they remain until it is desired to remove them, which is done by placing a bag or other receptacle beneath the box and withdrawing the sliding bottom D, when they fall into the receptacle. This sliding bottom proves to be a much more convenient arrangement than a drawer or other of the usual contrivances, being simpler in its operation. Within the chamber $A^1$, and between the glasses $B^3$ and $B^4$, is placed the burner of a lamp, Q, so that the light may fall upon the trap C, and pass through the glasses into the stage, and also be sent through the glass $B^4$ upon the mirror U, from whence it is reflected back into all parts of the vehicle, serving to light it, thereby enabling the lamp Q to light the fare-box, and also the interior of the omnibus or other vehicle, without the use of another or special light for that purpose. To cause the chamber A' to act as a chimney to produce a draft for supplying the lamp, I fit a diaphragm, R, within said chamber above the lamp, leaving only a narrow passage, r, for the air, smoke, and products of combustion, which eventually pass out at the escape S at the top of the chamber. Suitable apertures are formed in the sides and floor of the chamber A' below the lamp for the admission of air thereto. An inclined partition, T, is placed below the trap C, completely filling the box A, excepting the aperture t, through which the money from the trap falls, when the same is tilted. The object of this partition is to secure the lower chamber against theft from above. By connivance with the driver, who might pull up the rod M and tilt the trap, a confederate within the stage could insert a hooked wire through the opening H' and withdraw the money; but by the partition this is prevented, as it is impossible to reach the opening t by a wire.

*Claim.*

Having fully described the construction and operation of my invention, I will proceed to specify what I deem new and desire to secure by Letters Patent:

A fare-box for omnibuses and other similar vehicles, consisting of an elongated box, A, which is provided with flange G for fastening to or through the roof or driver's seat, with an incased rod, M, for operating the trap or valve C, with glass B at its top and glasses $B^1 B^2$ in its sides for convenience of seeing money put into either of the openings H or H', as and for the purpose set forth.

ZIMRI I. PRATT.

Witnesses:
   J. W. MUNDAY,
   H. F. BRUNS.